US009919906B2

(12) United States Patent
March et al.

(10) Patent No.: US 9,919,906 B2
(45) Date of Patent: Mar. 20, 2018

(54) LIFTING AND TRANSPORTING DEVICE INCLUDING FRONT LOAD SUPPORTING CASTORS AND ASSOCIATED LINKAGE SYSTEM

(71) Applicant: Austech & Design Pty Ltd, South Australia (AU)

(72) Inventors: Peter Raymond March, South Australia (AU); Kenneth Ian Bell, South Australia (AU)

(73) Assignee: Austech & Design Pty Ltd, South Australia (AU)

( * ) Notice: Subject to any disclaimer, the term of this patent is extended or adjusted under 35 U.S.C. 154(b) by 475 days.

(21) Appl. No.: 14/351,364

(22) PCT Filed: Oct. 12, 2012

(86) PCT No.: PCT/AU2012/001230
§ 371 (c)(1),
(2) Date: Apr. 11, 2014

(87) PCT Pub. No.: WO2013/053005
PCT Pub. Date: Apr. 18, 2013

(65) Prior Publication Data
US 2014/0299826 A1    Oct. 9, 2014

(30) Foreign Application Priority Data

Oct. 12, 2011  (AU) ................................ 2011904249

(51) Int. Cl.
*B66F 9/075*    (2006.01)
*A61G 7/08*    (2006.01)
(Continued)

(52) U.S. Cl.
CPC ............... *B66F 9/075* (2013.01); *A61G 7/08* (2013.01); *B62B 3/0612* (2013.01); *B62B 5/0079* (2013.01); *B62B 2202/90* (2013.01)

(58) Field of Classification Search
CPC ...... A61G 7/08; A61G 5/104; B62B 2202/90; B62B 3/061; B62B 5/0079;
(Continued)

(56) References Cited

U.S. PATENT DOCUMENTS 1,758,550 A  *  5/1930  Wolters .................. A47B 88/10
                                                                                312/331
1,999,220 A  *  4/1935  Towson ................ B62B 3/0612
                                                                                180/24
(Continued)

FOREIGN PATENT DOCUMENTS

EP         0765837 A1  *  4/1997  ................ B66F 5/02
EP         2039336 A2  *  3/2009  ............... A61G 7/08
(Continued)

*Primary Examiner* — Joseph J Hail
*Assistant Examiner* — Arman Milanian
(74) *Attorney, Agent, or Firm* — The Webb Law Firm

(57) ABSTRACT

The present invention relates to a lifting and transporting device. The device of the invention is useful for lifting and moving any object which has a pair of spaced apart wheels but is particularly adapted for the lifting and transporting of hospital beds. The bed lifter includes an improved means of supporting the load of a bed and/or bed/patient combination during lifting and transportation.

22 Claims, 14 Drawing Sheets

(51) Int. Cl.
  *B62B 5/00* (2006.01)
  *B62B 3/06* (2006.01)

(58) Field of Classification Search
  CPC ..... B62B 2202/67; B62B 3/0612; B62B 3/04; B62B 5/0083; B62B 5/063; B66F 9/075; B66F 7/26; Y10S 180/904
  See application file for complete search history.

(56) References Cited

U.S. PATENT DOCUMENTS

| | | | | |
|---|---|---|---|---|
| 2,161,659 A * | 6/1939 | Shepard, Jr. | ......... | B62B 3/0618 254/10 C |
| 2,359,493 A * | 10/1944 | Schreck | ............... | B62B 3/0612 180/13 |
| 2,418,279 A * | 4/1947 | Sax | ........................ | B60T 3/00 188/32 |
| 2,560,608 A * | 7/1951 | Stoner | .................. | B62B 3/0612 180/13 |
| 2,687,190 A * | 8/1954 | Hastings, Jr. | .......... | F16D 49/16 188/106 R |
| 2,846,018 A * | 8/1958 | Puckett | .................. | B60P 3/127 180/14.1 |
| 3,199,910 A * | 8/1965 | Bradley | .................. | B66C 1/485 280/460.1 |
| 3,265,158 A * | 8/1966 | Constable | ............ | B62B 3/0612 187/232 |
| 3,451,656 A * | 6/1969 | Goodacre | ............. | B62B 3/0612 254/8 R |
| 3,876,024 A * | 4/1975 | Shieman | .............. | B62D 51/005 180/19.1 |
| 4,997,331 A * | 3/1991 | Grinsted | ................... | B64F 1/22 180/14.1 |
| 5,110,067 A * | 5/1992 | Sinkkonen | ............... | B64F 1/22 180/904 |
| 5,391,044 A | 2/1995 | Young | | |
| 5,511,926 A * | 4/1996 | Iles | ......................... | B64F 1/22 180/904 |
| 5,580,207 A * | 12/1996 | Kiebooms | .............. | B66F 5/025 180/19.2 |
| 5,909,996 A * | 6/1999 | Cowell | .................. | B60P 3/125 280/402 |
| 6,231,294 B1 | 5/2001 | Young et al. | | |
| 6,725,956 B1 * | 4/2004 | Lemire | ................... | A61G 7/08 180/15 |
| 6,725,979 B1 * | 4/2004 | Snook | ..................... | B60T 3/00 188/32 |
| 6,729,421 B1 * | 5/2004 | Gluck | ..................... | A61G 7/08 180/11 |
| 6,871,714 B2 * | 3/2005 | Johnson | .................. | A61G 7/08 180/19.2 |
| 6,945,354 B2 * | 9/2005 | Goff | ......................... | B64F 1/22 180/904 |
| 7,021,407 B2 * | 4/2006 | Ruschke | ................ | A61G 7/08 180/11 |
| 7,500,448 B1 * | 3/2009 | Melhorn | ................ | A01K 31/00 119/401 |
| 7,506,707 B2 * | 3/2009 | Trujillo | ................... | B60L 11/18 180/19.1 |
| 7,533,742 B2 * | 5/2009 | Johnson | .................. | A61G 7/08 180/16 |
| 7,712,558 B2 * | 5/2010 | Helson | .................. | B62B 5/0079 180/19.1 |
| 8,016,303 B1 * | 9/2011 | Ullman | ................ | B62B 5/0083 280/79.4 |
| 8,016,334 B2 * | 9/2011 | Garrett | ................ | A01D 87/122 294/119.1 |
| 8,165,718 B2 * | 4/2012 | Ota | ......................... | A61G 7/08 382/153 |
| 8,515,594 B2 * | 8/2013 | Perry | ...................... | B64F 1/22 180/904 |
| 8,911,194 B1 * | 12/2014 | Spinazze | ................ | B60B 30/10 414/427 |
| 2003/0159861 A1 * | 8/2003 | Hopper | .................... | A61G 7/08 180/22 |
| 2004/0213656 A1 * | 10/2004 | Lear | ......................... | A61G 7/08 414/495 |
| 2006/0045711 A1 * | 3/2006 | Schuchardt | ........... | B62B 3/0612 414/663 |
| 2008/0101903 A1 * | 5/2008 | Waner | ...................... | A61G 7/08 414/495 |
| 2008/0223649 A1 * | 9/2008 | Wandeler | .............. | A61G 3/065 180/333 |
| 2009/0134374 A1 | 5/2009 | Krug | | |
| 2012/0007335 A1 * | 1/2012 | Perry | ..................... | B60S 13/00 280/402 |
| 2012/0029697 A1 * | 2/2012 | Ota | ......................... | A61G 7/08 700/253 |

FOREIGN PATENT DOCUMENTS

| | | | | |
|---|---|---|---|---|
| NL | 1016924 C2 * | 6/2002 | ............ | A61G 7/08 |
| WO | 8911893 A1 | 12/1989 | | |
| WO | 8911983 A1 | 12/1989 | | |

* cited by examiner

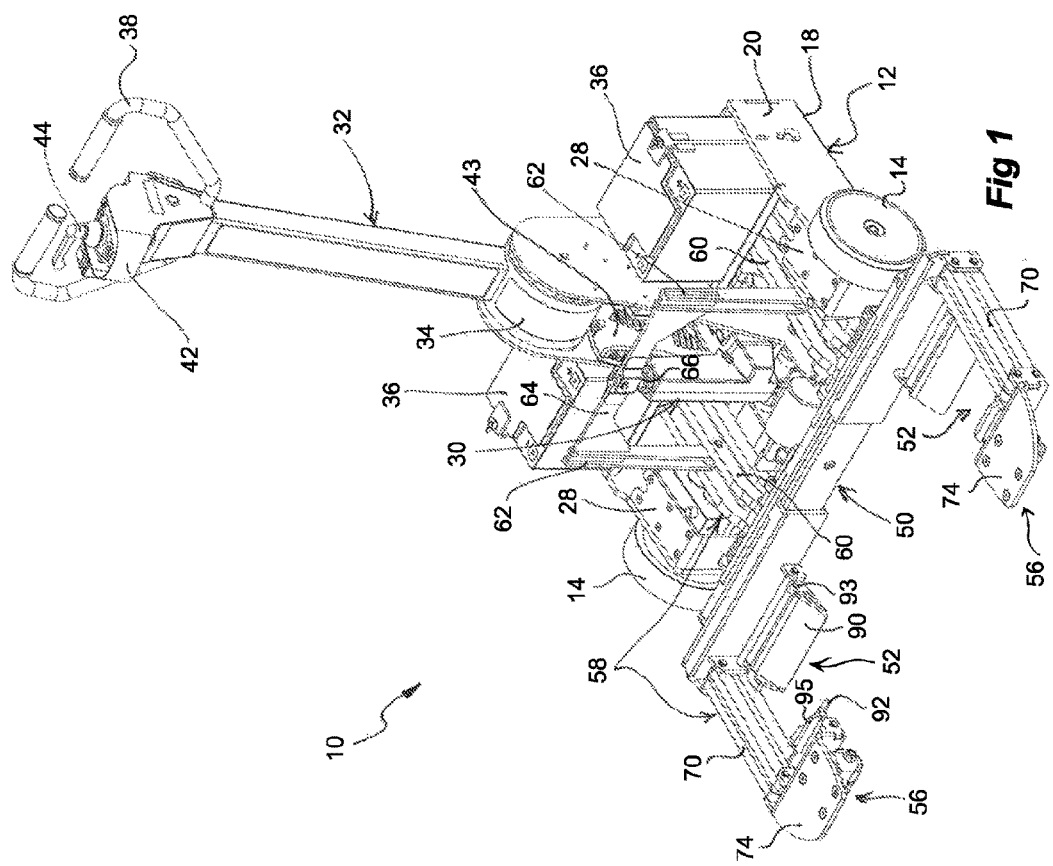

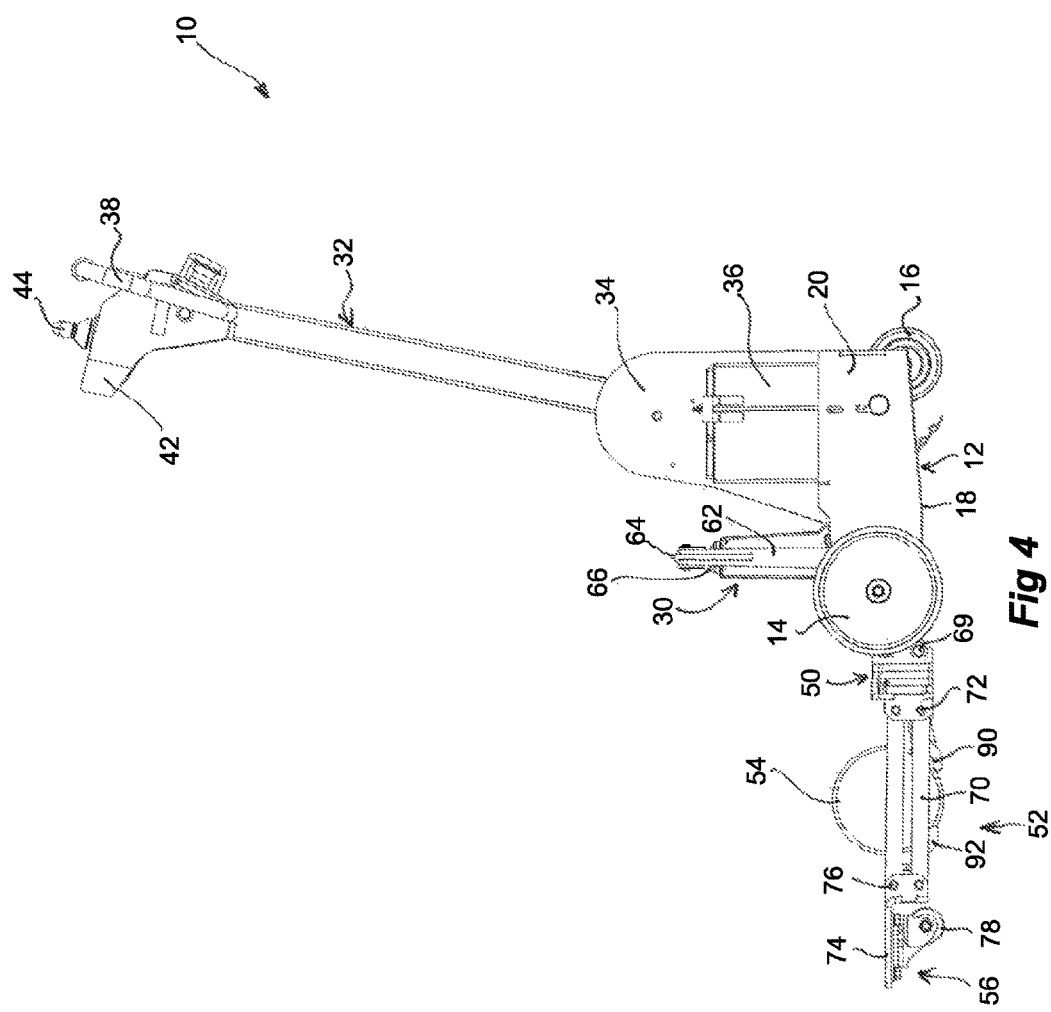

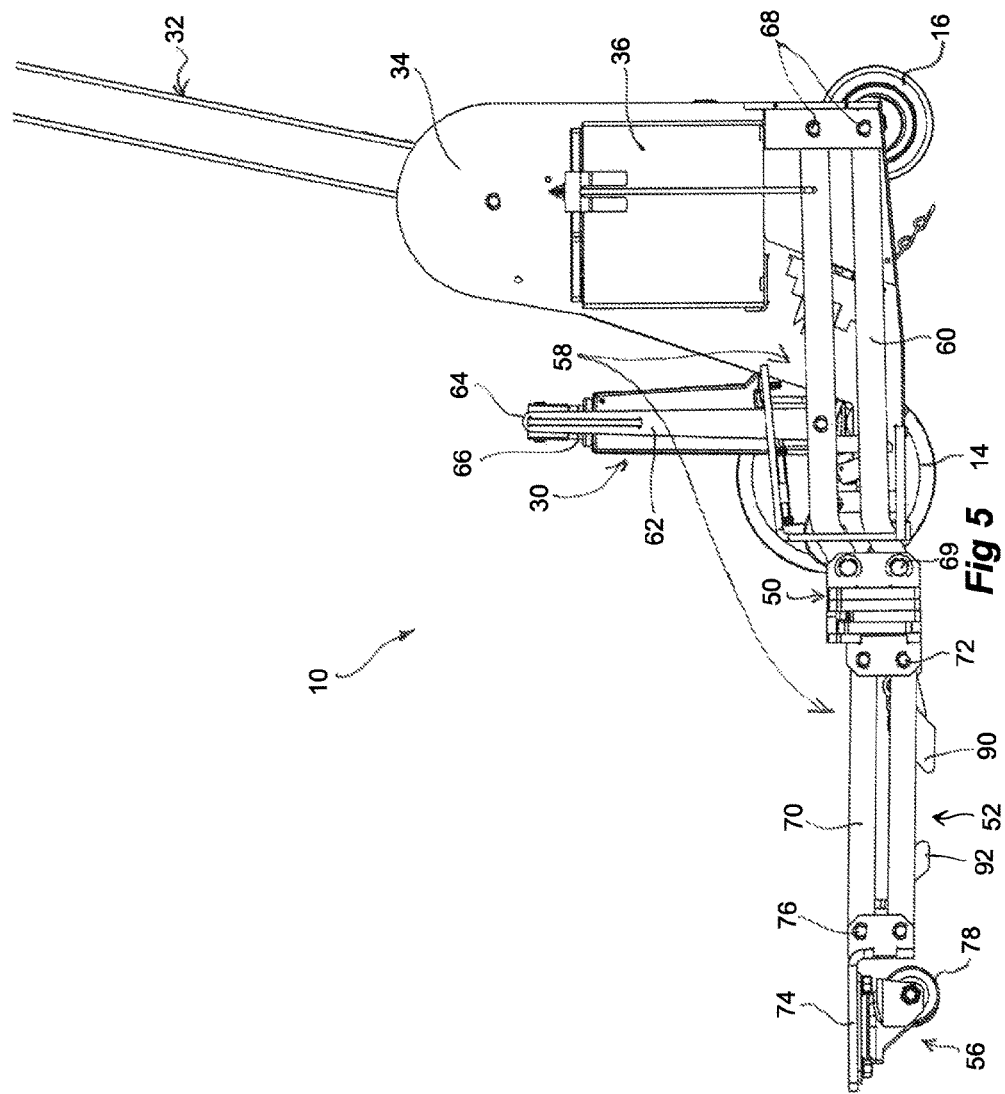

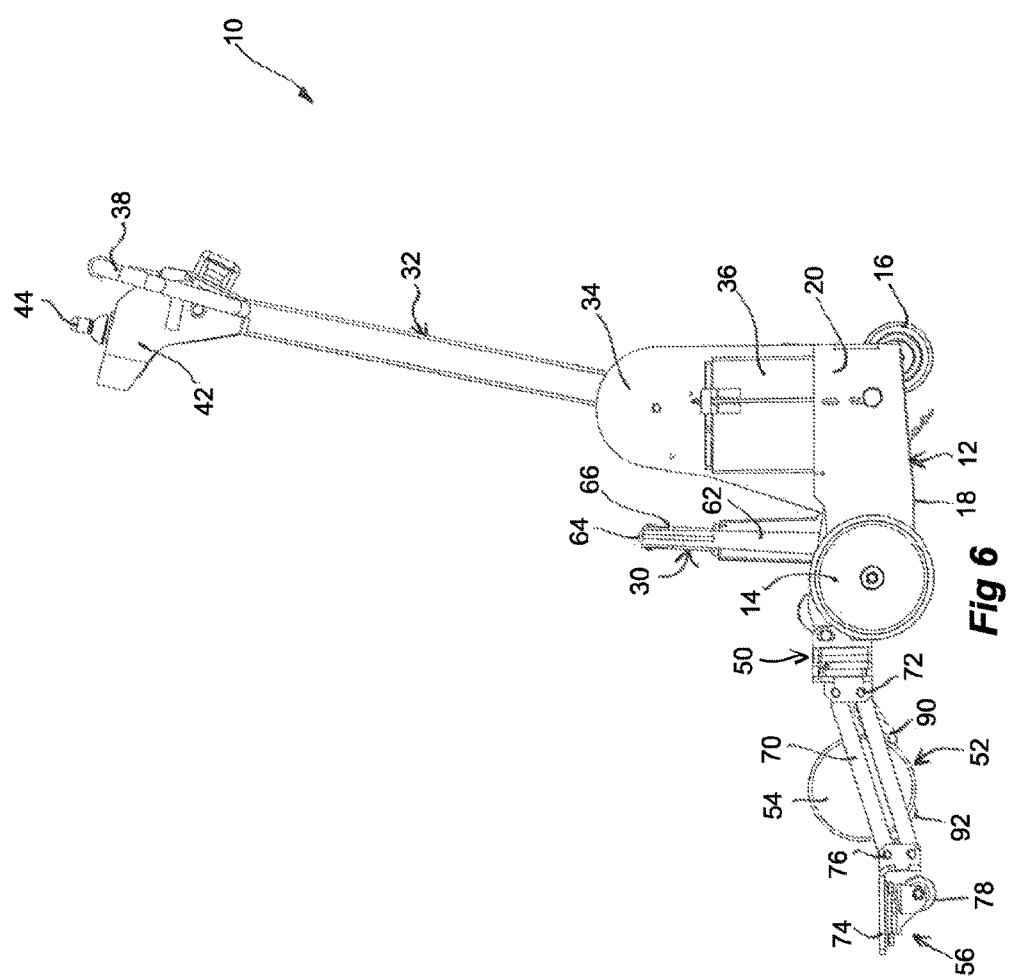

LIFTING AND TRANSPORTING DEVICE INCLUDING FRONT LOAD SUPPORTING CASTORS AND ASSOCIATED LINKAGE SYSTEM

CROSS-REFERENCE TO RELATED APPLICATIONS

This application is the U.S. national phase of International Application No. PCT/AU2012/001230 filed Oct. 12, 2012, and claims priority to Australian Patent Application No. 2011904249 filed Oct. 12, 2011, the disclosures of which are hereby incorporated in their entirety by reference.

FIELD OF THE INVENTION

The present invention relates to a lifting and transporting device. The device of the invention is useful for lifting and moving any object which has a pair of spaced apart wheels but is particularly adapted for the lifting and transporting of hospital beds. The bed lifter includes an improved means of supporting the load of a bed and/or bed/patient combination during lifting and transportation.

BACKGROUND OF THE INVENTION

A variety of lifting and transportation devices for hospital beds are known. However, known problems with existing devices is their potential to topple forwards when the load of a bed and patient combination is significant or greater than a predetermined threshold. For example, if a patient carries significant weight, the skilled addressee would understand how this may cause a transportation device to topple forwards.

Proposed solutions to this problem include balancing the load of the bed using a ballast, and in doing so attempting to support the load more centrally over the bed mover chassis. However, for some bed-mover designs, such solutions are not appropriate.

Another problem that exists in prior art bed movers is that their jaw mechanisms, which serve to grip part of the bed, often fail to provide sufficient clearance beneath obstructions such as bed pedals, as well as mid-height obstacles such as bed brake pedals. The result is that the bed mover may not be universally usable. There are also inherent issues with existing jaw assemblies known to the Applicant in their inability to correctly engage a bed or part thereof prior to lifting, particularly when wheels of the item are being lifted and are not positioned exactly parallel with the centreline of the device.

SUMMARY OF THE INVENTION

In one aspect, the present invention provides a lifting and transporting device for an item or part thereof having spaced apart wheels, said lifting device characterised by:

a frame supported above wheels including at least one drive wheel for moving said frame, said wheels being load-supporting;

at least one wheel engagement attachment supported by said frame, the attachment(s) configured to engage the spaced apart wheels of the item being lifted;

a wheel assembly associated with the at least one wheel engagement attachment, each wheel assembly being forwardly disposed from the attachment such that one or more wheels of said wheel assembly are also load-supporting, the load of the item being distributed across the frame wheels and the wheel assemblies; and a means of lifting the at least one wheel engagement attachment to enable transportation of the item.

In an embodiment, each wheel engagement attachment extends between a rack disposed at the front of the frame, the rack adapted to support a rear of each wheel engagement attachment, and respective wheel assemblies disposed at the front of each attachment, the wheel assemblies adapted to support a front of each wheel engagement attachment.

In an embodiment, the rack and wheel assemblies are associated via a front linkage system which allows for upward rotation of the rack while the wheel assemblies remain grounded.

In an embodiment, the rack and frame are associated via a rear linkage system which allows for upward rotation of the rack relative to a rear pivot point.

In an embodiment, the rear linkage system includes an associated actuator for causing said upward rotation of the rack relative to the rear pivot point.

In an embodiment, said actuator includes a controller which allows an operator to control operation of the actuator and hence control lifting and lowering of the rack.

In an embodiment, lifting of the rack causes lifting of the rear portion of each wheel engagement attachment and hence lifting of the item wheels from a ground surface while the front wheel assemblies remain grounded.

In an embodiment, subsequent lowering of the rack causes lowering of the rear portion of each wheel engagement attachment and hence lowering of the item wheels to the ground surface while the front wheel assemblies remain grounded.

In an embodiment, said item includes two spaced apart wheels, and said frame includes a first axis extending along a centreline of the frame from a front to a rear of the device and two wheel engagement attachments configured to support the two spaced apart wheels during lifting.

In an embodiment, each attachment is moveable with respect to the frame along a second axis which extends substantially perpendicularly to said first axis, wherein said engagement occurs when the attachments and wheels are first aligned along said second axis or an axis parallel thereto and the attachments then moved towards respective wheels until the attachments and wheels are substantially aligned along said first axis or an axis parallel thereto.

In an embodiment, each wheel engagement attachment is slidably moveable in equal and opposite directions along a rack disposed at the front of the frame and extending along said second axis or an axis parallel thereto.

In an embodiment, each wheel engagement attachment is adapted to be moved to a greater spaced apart distance than the wheels before being moved inwardly towards the respective wheels for engagement thereof.

In an embodiment, each wheel engagement attachment includes a jaw having at least a forward and rearward wheel abutment surface.

In an embodiment, said jaw is open on an inner side thereof for accepting said wheel when moving there towards.

In an embodiment, each wheel engagement attachment includes a means of adjusting the distance between said forward and rearward wheel abutment surface to accommodate wheels of different diameter.

In an embodiment, each wheel engagement attachment is adapted to be disposed between the wheels before being moved in an outwardly direction towards the respective wheels for engagement thereof.

In an embodiment, said jaw is open on an outer side thereof for accepting said wheel when moving there towards.

In an embodiment, each wheel engagement attachment includes a means of adjusting the distance between said forward and rearward wheel abutment surface to accommodate wheels of different diameter.

In an embodiment, each wheel engagement attachment is associated with a toothed rack respectively, each toothed rack being in meshed engagement with a driven spur gear associated with said rack, whereby rotation of said spur gear in one direction causes the attachments to move away from one another at a constant rate, and rotation in the opposite direction causes the attachments to move toward one another at a constant rate.

In an embodiment, when one attachment engages a first wheel before the other, one of said toothed racks stops and thereby causes the spur gear and hence second rack to continue moving towards the engaged jaw until the second wheel is engaged.

In an embodiment, the frame includes two drive wheels at a front thereof the frame and a rear steering wheel.

In an embodiment, the drive wheels are operated by two electric motors coupled to reduction gear boxes powered by one or more rechargeable batteries.

In an embodiment the wheel assemblies include castor wheels.

In an embodiment, said rack includes a low profile so as not to interfere with low to mid obstructions associated with the item being transported.

In an embodiment, said item is a hospital bed having two front and two rear wheels, said two rear wheels adapted to be lifted by said device to facilitate transportation of the bed or bed/occupant.

DESCRIPTION OF DRAWINGS

The above and other objects, features, and advantages of the present invention will be apparent from the following detailed description of a preferred embodiment in conjunction with the accompanying drawings. In the drawings:

FIG. 1 illustrates a front, top perspective view of a lifting and transporting device in accordance with an embodiment of the present invention;

FIG. 4 illustrates a side view of the lifting and transporting device of FIG. 1 with wheels of a bed engaged and the jaw assemblies in their lowered positions;

FIG. 5 illustrates an enlarged side view of the lifting and transporting device of FIG. 1 with some side components removed so that the linkage system is visible;

FIG. 6 illustrates a side view of the lifting and transporting device of FIG. 1 with the wheels of a bed engaged and the jaw assemblies in their raised positions;

DESCRIPTION OF THE EMBODIMENTS

Figure 3:
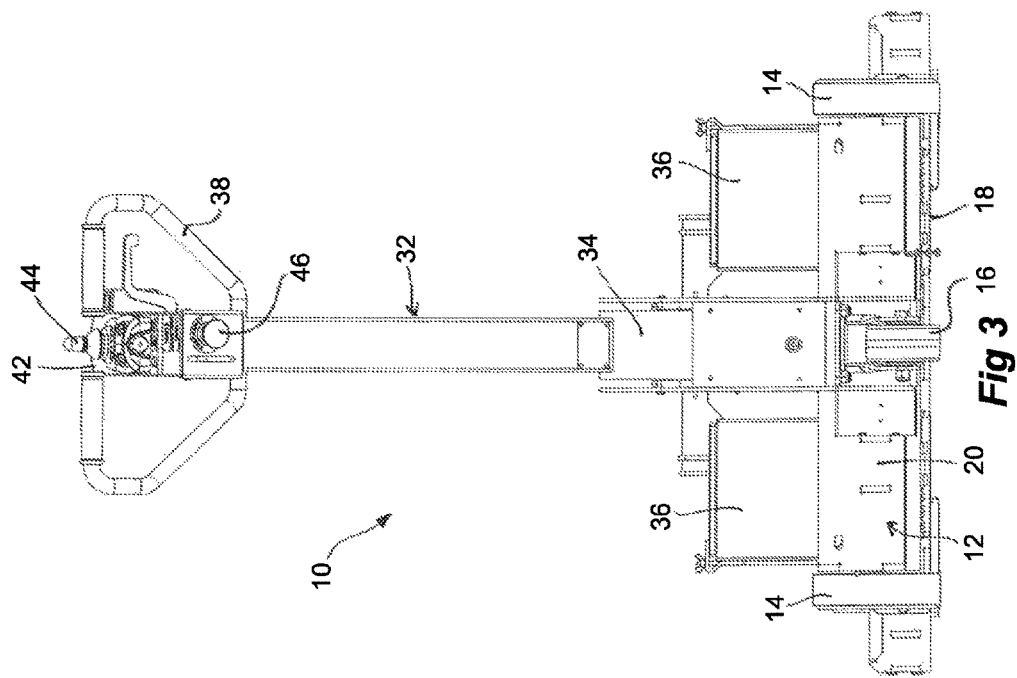
FIG. 3 illustrates a rear view of the lifting and transporting device of FIG. 1.
Figure 2:
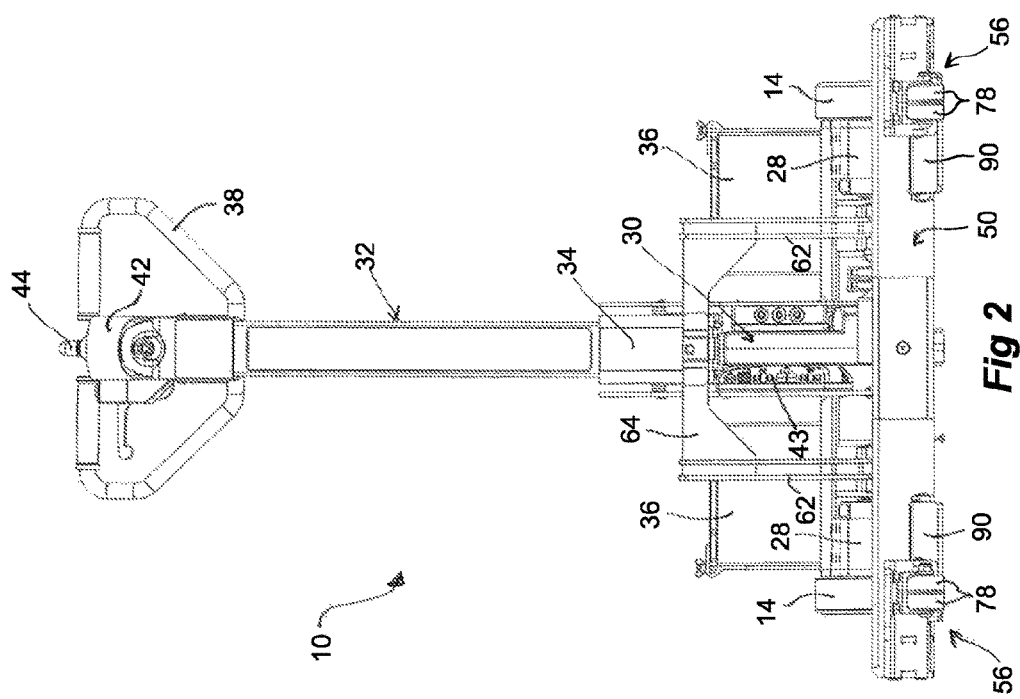
FIG. 2 illustrates a front view of the lifting and transporting device of FIG. 1.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the embodiments and the following description to refer to the same and like parts.

In one aspect, the present invention relates to a lifting and transporting device or bed lifter 10 and, in particular, to a bed lifter including an improved means of supporting the load of a bed and/or bed/patient combination during lifting and transportation.

The bed lifter 10 according to an embodiment is shown in FIGS. 1-6. The lifter includes a frame 12 on which are mounted two forward wheels 14 and one rearward wheel 16. The frame 12 may be constructed of multiple components, interconnecting portions, and platforms, but for the purpose of brevity it will be referred to herein by single reference numeral 12.

An important feature of the frame 12 is that it forms a relatively low rise platform for supporting various components, the frame in one embodiment including a base 18 and upright walls 20. The front wheels 14, which are driven wheels, may extend along the outside of the upright side walls and serve to locate the frame 12 at the rear (or front) of a bed to be lifted. The front wheels 14 may be powered by two motors 28 supported above the frame 12 and positioned inside of the front wheels 14 and extending rearwardly. The rearward wheel 16 is preferably a non-driven castor wheel.

In an embodiment, located centrally above the frame 12 is a vertically mounted actuator 30 which is mounted to the frame at its lower end via a pin (not shown). The upper end of the actuator 30 may thus freely rotate about the pin. The function of the actuator 30 will be described in further detail below.

In an embodiment, handle assembly 32 is positioned at the rear of the frame 12 and extends down to a spindle 34 which allows for pivotal adjustment of the handle 32 relative to the frame 12, that is, adjustment of the angle at which the handle 32 extends upwardly and rearwardly. The rear castor 16 may be suspended just below the spindle 34. On either side of the spindle 34, the frame may include two platforms for supporting a pair of batteries 36. The batteries 36 provide power to the motors 28 and may be rechargeable, thereby eliminating the need to have any mains power supplied to the device during operation.

In an embodiment, the handle assembly 32 includes handle bars 38 at an upper end thereof for a user to grip when transporting the device 10, and controls therein that operate the motors 28 and the actuator 30. A control unit 42 may be also located at the top of the handle 34. The control unit 42 may be operatively connected to both the motors 28 (via a programmable power module 43) and the actuator 30. The power module 43 may receive input from the control unit 42 and sends the correct amount of power to the relevant wheel motor 28. Control unit 42 thereby allows for variable speed control for forward and backward movement of the device 10.

Forward and backward movement may be instigated through lever 44, and there may also be a brake 46 which allows the operator to stop the device quickly in an emergency. Electronic control units are available for purchase as an off the shelf item and is readily adapted to suit the needs of the present device. Variable speed indicators and controllers may be incorporated into the control unit together with more sophisticated options such as a battery power gauge to display the availability of power from each or a combination of both batteries included in the unit.

Some of the components of the device 10 described above may be applied across all aspects of the present invention in that they relate generally to the frame configuration and how a user can move and operate the device 10 through manipulation of a lever 42, although other variations are certainly possible.

The following description relates particularly to the components of the device 10 which allow items such as beds to be lifted and moved, and the load of the item to be appropriately supported to prevent toppling of the device. There is shown at the front of the device a rack 50, two slideable jaw assemblies 52 associated therewith and used to engage bed wheels 54, front castor wheel assemblies 56 for lowering the centre of gravity of the device and assisting the front drive wheels in supporting the load, and a linkage system 58.

Figure 7:
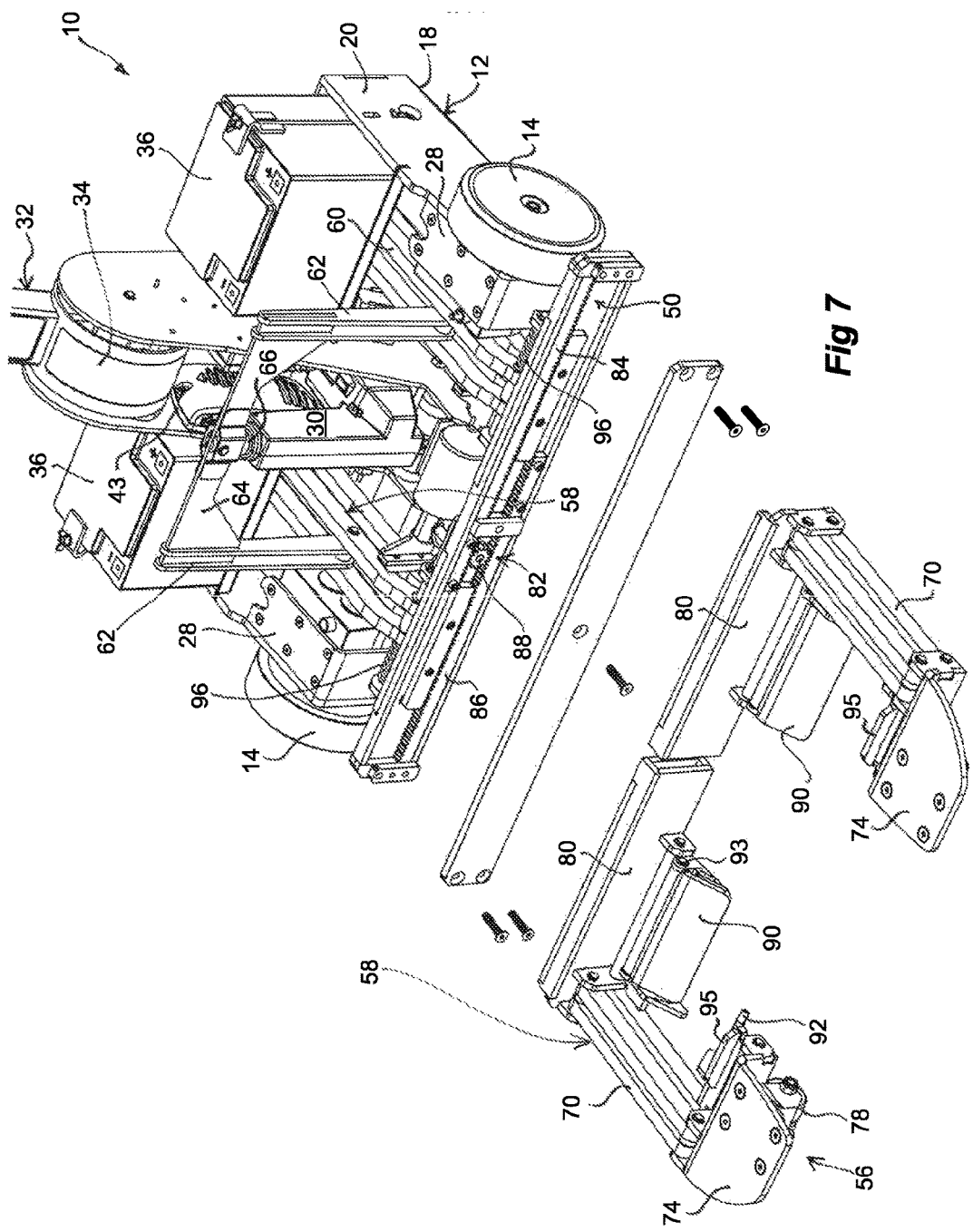
FIG. 7 illustrates an enlarged and partially exploded perspective view of the lifting and transporting device of FIG. 1, showing the rack and spur gear mechanism which enables movement of each jaw assembly.

The linkage system 58 may include rear parallel linkages 60 on either side of the actuator 30, coupling the rear of the frame 12 with the front rack 50 as shown most clearly in FIGS. 1, 5 and 7. Upright members 62, which may be pivotably attached at their lower ends to each parallel linkage 60 at a position adjacent the front ends of each linkage 60, may be fixed to a transverse cross bar 64 to which the actuator piston 66 is operatively connected.

The skilled addressee would thus realise that operation of the actuator 30 in this embodiment causes the front end of the parallel linkages 60 to lift slightly and as the linkages rotate about their rear pivot points 68. At rest, the actuator 30 may assume a withdrawn position as shown in FIGS. 4-5. As the actuator is operated the piston 66 emerges and acts against the cross bar 64 to thereby raise the upright members 62 to the position shown in FIG. 6. When the upright members are raised, the forward ends of the parallel linkages 60 are also raised and, owing to their pivotable rear connections, the rack 50 is lifted substantially vertically while the frame 12 remains vertically stationary. Each parallel linkage 60 is also pivotably associated with the rack 50 such that rotation occurs about pins 69. This configuration thus ensures that the rack 50 and hence bed wheels are lifted a sufficient distance above the ground to enable transportation. Although not shown, coil springs and like components can be used to assist in the various operations.

FIG. 6 shows the rack 50 in its raised position, and it can be appreciated in this Figure that the bed wheels 54 need only be lifted a short distance above the ground in order for the device 10 to be used to transport the item being shifted.

The linkage system 58, according to an embodiment, further includes front parallel linkages 70 which, together with the jaw assemblies 52 and front castor wheel assemblies 56, are slidably mounted to the rack 30. Each slideable linkage 70 extends forwardly from the rack and is also pivotably connected thereto about rack pivot points 72. At their forward end, each linkage 70 may also be pivotably coupled to the horizontal mounting surface 74 of each castor wheel assembly 56 about a castor pivot point 76. The linkage 70, jaw assembly 52 and castor wheel assembly 56 on left and right hand sides of the rack 50 are thus slideable inwardly and outwardly in a transverse direction relative to the centreline of the device. Support for the item being lifted by the jaw assemblies is thus provided by both the front drive wheels 14 and the additional castor wheel assemblies 56 disposed forwardly thereof and connected to rack 50 via linkages 70.

Individual members forming part of each linkage have not been explicitly described herein for brevity, but it's to be understood that reference herein to a parallel linkage including a pivotable connection implies both members of the linkage are pivotably connected. For example, each linkage 60 extending between the rack 50 and the rear part of the frame 12 may include two vertically disposed members which are both pivotably connected to the respective components at ends thereof.

The reader would now appreciate how the lifting and transporting device of the present invention is able to lift and support the load of an item being transported. According to the embodiment so far described, once the wheels of an item are engaged by the jaw assemblies 52 the actuator 30 is operated such that its piston 66 raises and lifts cross bar 64, thereby raising the parallel linkages 60 and front rack 50. In turn, the rear ends of the forward parallel linkages 70 are raised, and owing to their pivotable connections at both their front and rear ends, the front castor assemblies 56 are pulled slightly rearwardly but are maintained in their grounded positions. As shown perhaps most clearly in the front view of FIG. 3, each castor wheel assembly 56 includes a pair of laterally spaced apart castor wheels 78, the castor wheel pairs ensuring further stability.

The use of the front castor wheel assemblies 56 and the associated linkage system ensures that load is distributed more efficiently and that the centre of gravity is lowered to an extent to prevent toppling of the device, even under heavy loads. The linkage configuration and castor wheel further ensures that the horizontal mounting surface 74 of each castor assembly remains parallel with the ground through the whole range of linkage movement, meaning the wheels 76 are free to rotate about their axes, friction is reduced, and there is no additional load placed on the drive motors.

The fact that the rack 50 is able to be located so close to the ground, which in the embodiment shown is achieved at least in part by the parallel linkages 60 including a downward extension at their front ends, further ensures that there is sufficient clearance above the rack 50 for components of the item being lifted. For example, when transporting hospital beds, bed brake pedals extend rearwardly and have often interfered with movement of ballasts and the like associated with prior art bed lifters.

As mentioned earlier, the jaw assemblies 52, front parallel linkages 70 and front castor wheel assemblies 56 are inwardly and outwardly slideable along the rack 50 so that wheels of an item being lifted may be engaged by the jaw assemblies. Each of these components is attached, or pivotably attached in the case of the front parallel linkages 70, to a respective moveable housing 80. FIG. 7 illustrates most clearly the gear mechanism 82 inside the rack 50 with which each housing 80 is associated to effect movement of the components attached thereto. In particular, there is shown an upper toothed rack 84 which is connected to the right hand side housing 80 and a lower toothed rack 86 which is connected to the left hand side housing 80. Both of the toothed racks 84 and 86 are driven by a single spur gear or pinion 88 which is rotatable by a further motor (not shown), and which is associated with the rack 50 such that from the perspective of an operator at the rear of the device, rotation of the spur gear in an anticlockwise or clockwise direction will cause respective left or right movement of the rack 50.

For present purposes, the left hand side is taken to be the left side of the device from the perspective of an operator of the device who is facing forwards.

Figure 8:
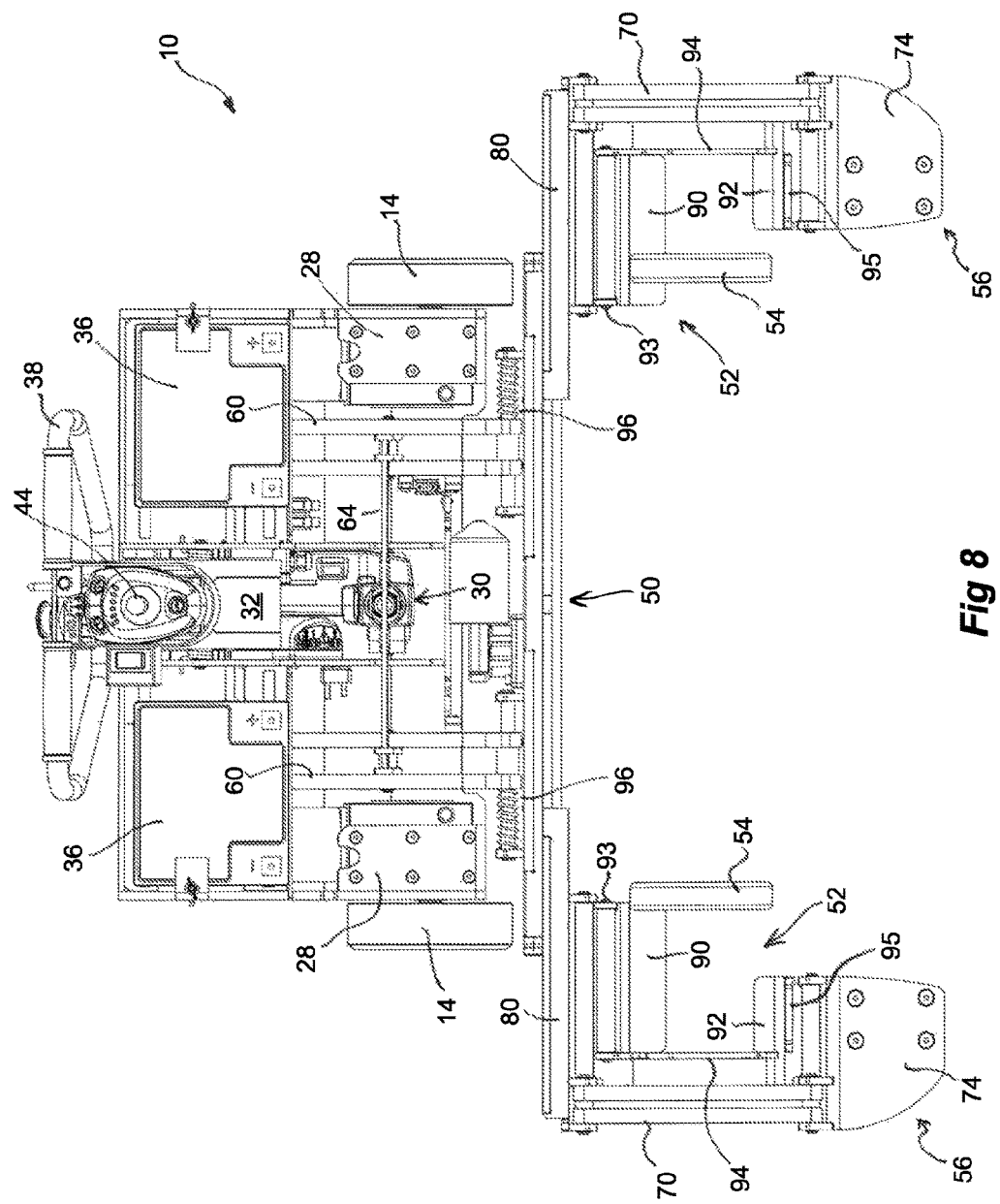
FIG. 8 illustrates a top view of the lifting and transporting device of FIG. 1 with jaw assemblies positioned in an outer position and bed wheels each having a centreline that is misaligned with the centreline of the device.
Figure 9:
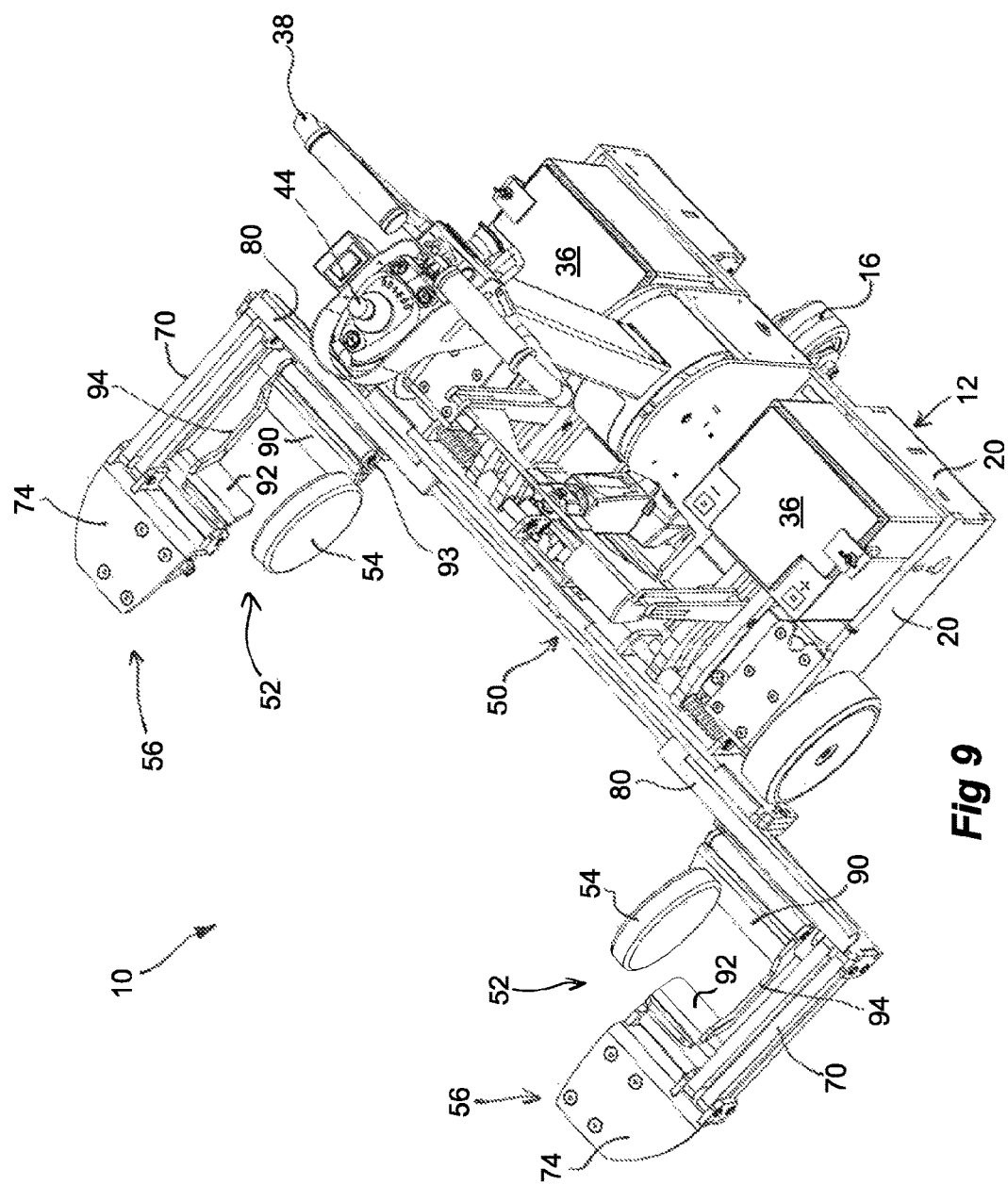
FIG. 9 illustrates a top, rear perspective view of the lifting and transporting device in the operational state shown in FIG. 8.

FIGS. 8 and 9 show the device 10 according to an embodiment after each housing 80 and hence each jaw assembly 52 has been shifted to an outer position ready to engage the wheels of a bed, such movement resulting from the actuation of the spur gear motor (not shown) which rotates the spur gear 88. Rotation of the spur gear in one direction causes the upper and lower toothed racks 84 and 86 to move outwardly, by way of meshed engagement with the spur gear, and inwardly when the gear 88 is rotated in the opposite direction. The present invention is not intended to be limited to any one direction of rotation to cause movement of the jaw assemblies in one direction or the other.

Therefore, the central gear 88 may drive each toothed rack and therefore each housing 80 and jaw and castor assembly associated therewith at the same time in opposite directions and at a constant rate.

The next step according to an embodiment is that the device 10 must be moved to the bed to be lifted and positioned such that the wheels 54 of the bed are located between the jaw assemblies 52, as shown in FIGS. 8 and 9. Once in position, the spur gear motor can be actuated again but in the opposite direction to cause each toothed rack and associated housing to move inwardly. In the embodiment shown, each jaw assembly is made up of a rear ramp 90 extending forwardly from housing 80 and a front opposed ramp 92 extending rearwardly from the castor wheel assembly 56, the front and rear ramps being spaced apart and configured according to the item being moved.

For most conventional hospital beds for example, there is a standard wheel diameter, and so for this application the distance between the ramps and also the length of the front linkages 70 may be constructed accordingly. However, configurations which allow for the jaw assemblies to be adjusted to suit other wheel diameters are also considered to be within the scope of the present invention. In the embodiment shown for example, each rear ramp 90 is rearwardly pivotable about a pin 93 to a position in which the surface beneath each rear ramp 90 would form the contact surface for the wheel 54. The skilled addressee would realise that this would allow for larger diameter wheels.

The rear ramps 90 extend inwardly a greater distance than the front ramps 92. This is to allow the device to be wheeled to a bed, and for the jaw assemblies to be moved outwardly a sufficient distance such that device can then be moved forwards until the bed wheels 54 and rear ramps 90 make contact.

Figure 10:
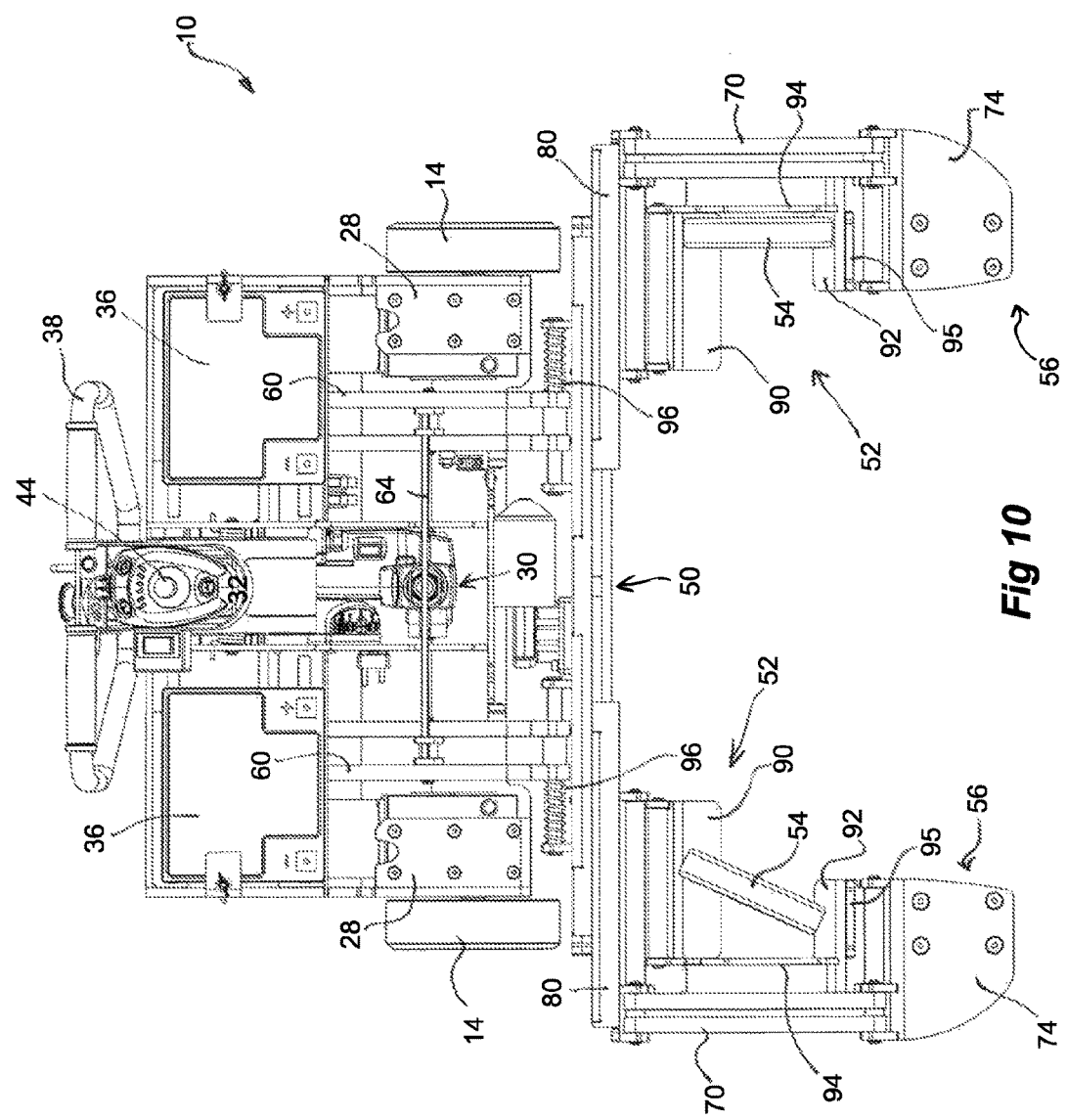
FIG. 10 illustrates a top view of the lifting and transporting device after the jaw assemblies have been shifted inwardly and the LHS jaw assembly has engaged the left wheel of the bed.
Figure 11:
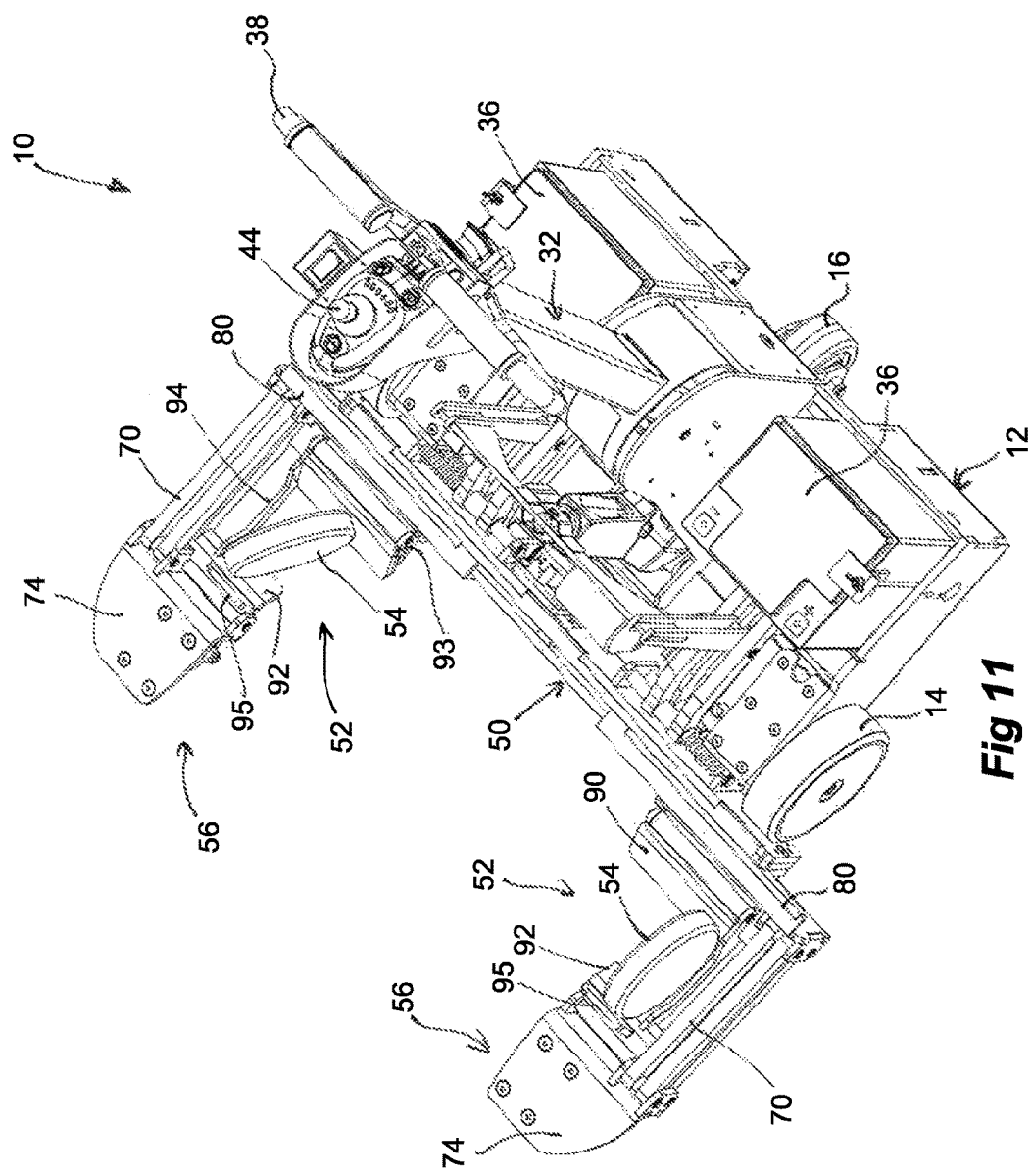
FIG. 11 illustrates a top, rear perspective view of the lifting and transporting device in the operational state shown in FIG. 10.

The next step, in an embodiment, is the inward movement of each jaw assembly to a position which ensures that each wheel 54 of the item being lifted is properly engaged by the device 10, that is, wherein each wheel 54 is located above the opposed front and rear ramps of each jaw assembly in a straight configuration, that is, parallel with the centreline of the device. An important feature of each jaw assembly 52 is the outer wall 94 (shown only in FIGS. 8-13) which ensures proper alignment of the wheels 54 as the jaws close in on the wheels. FIGS. 10 and 11 show an example of where a wheel 54 may be misaligned or angled. The jaw assemblies 52 of an embodiment of the present invention ensure that such misaligned wheels will straighten prior to lifting by way of contact with the outer walls 94 as each jaw assembly moves inwardly.

In an embodiment, an upright bumper 95 is also present above each front ramp 92 of the jaw assemblies. The function of the bumper 95 is to ensure that the bed wheels 54 do not roll forwards during transportation of the bed or wheeled item, something which has been known to occur during particular movements. It is to be understood that the bumper 95 could be of an alternate configuration to that which is shown, for example, it could extend higher or at a different angle if need be, or could include a pivotable or slideable extension (not shown) to enable it bridge any gaps that may exist between itself and the wheel 54.

There may be times where the item being moved and the device 10 are misaligned, for example, when an operator has not positioned the device 10 on the exact centreline of the item. This would normally result in one jaw assembly reaching a castor wheel before the other, as shown in FIGS. 10 and 11. The jaw assemblies will only stop sliding inwardly when either one contacts the endstop of the rack or the wheels of the bed to be lifted, and the result is that one wheel may be appropriately positioned within the jaw, but not the other.

In the example shown, when the left hand side jaw assembly 52 stops after making contact with the left hand side bed wheel, the lower toothed rack 86 also stops moving. The spur gear 88, while previously rotating in a stationery position, is thereby forced to rotate along the lower toothed rack 86 towards the left side. In doing so, the right hand jaw assembly continues to move inwardly, and the rack 50 itself moves towards the left side as a result of leftward movement of the spur gear. In other words, the jaw which connects with the bed wheel first pulls the rack 50 sideways until the second jaw connects with the opposite bed wheel. This movement continues until the second bed wheel is also engaged, as shown in FIGS. 12 and 13.

Figure 12:
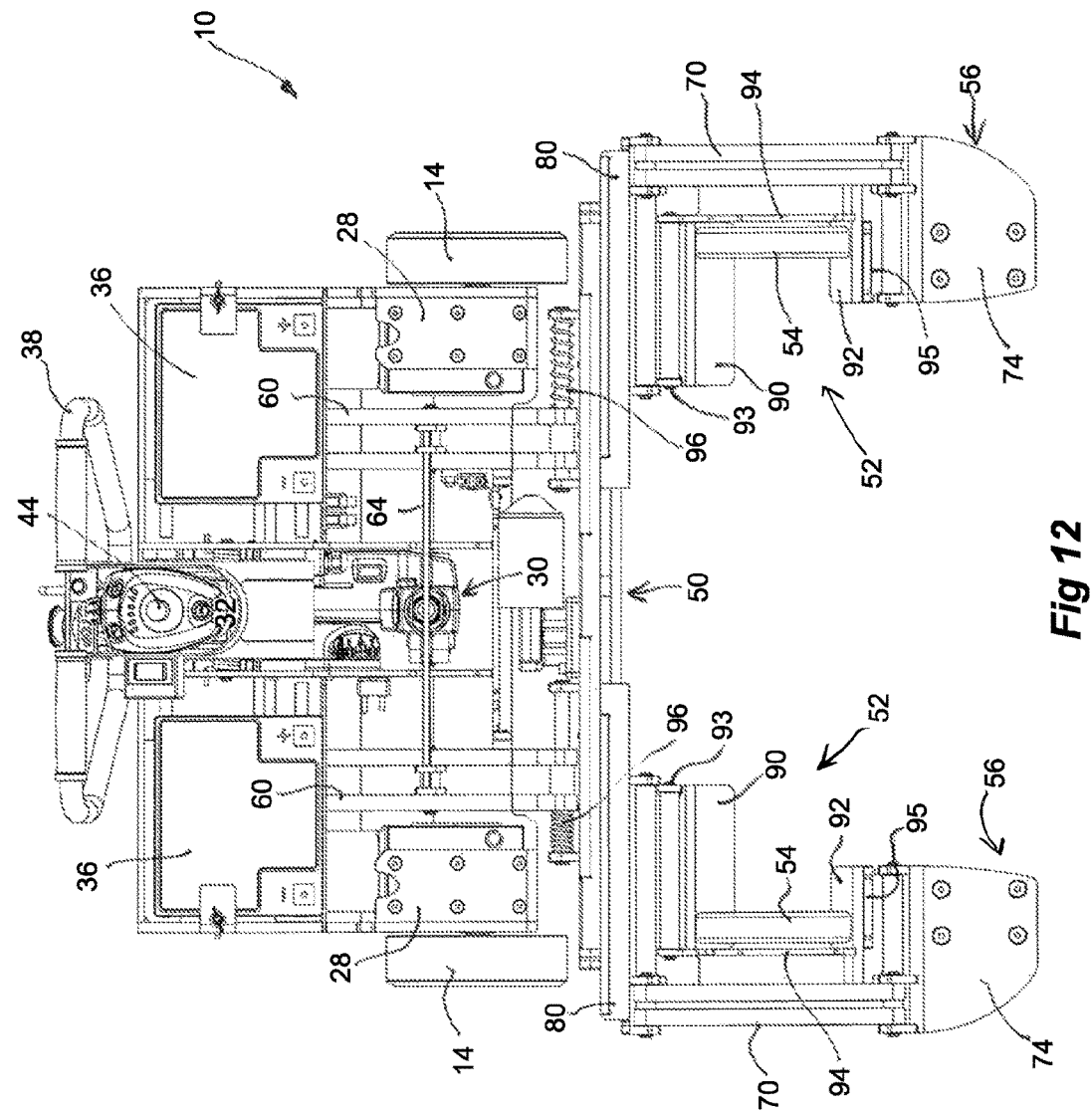
FIG. 12 illustrates a top view of the lifting and transporting device after the LHS jaw assembly has pulled the rack sideways and the RHS jaw assembly has engaged the right wheel of the bed.
Figure 13:
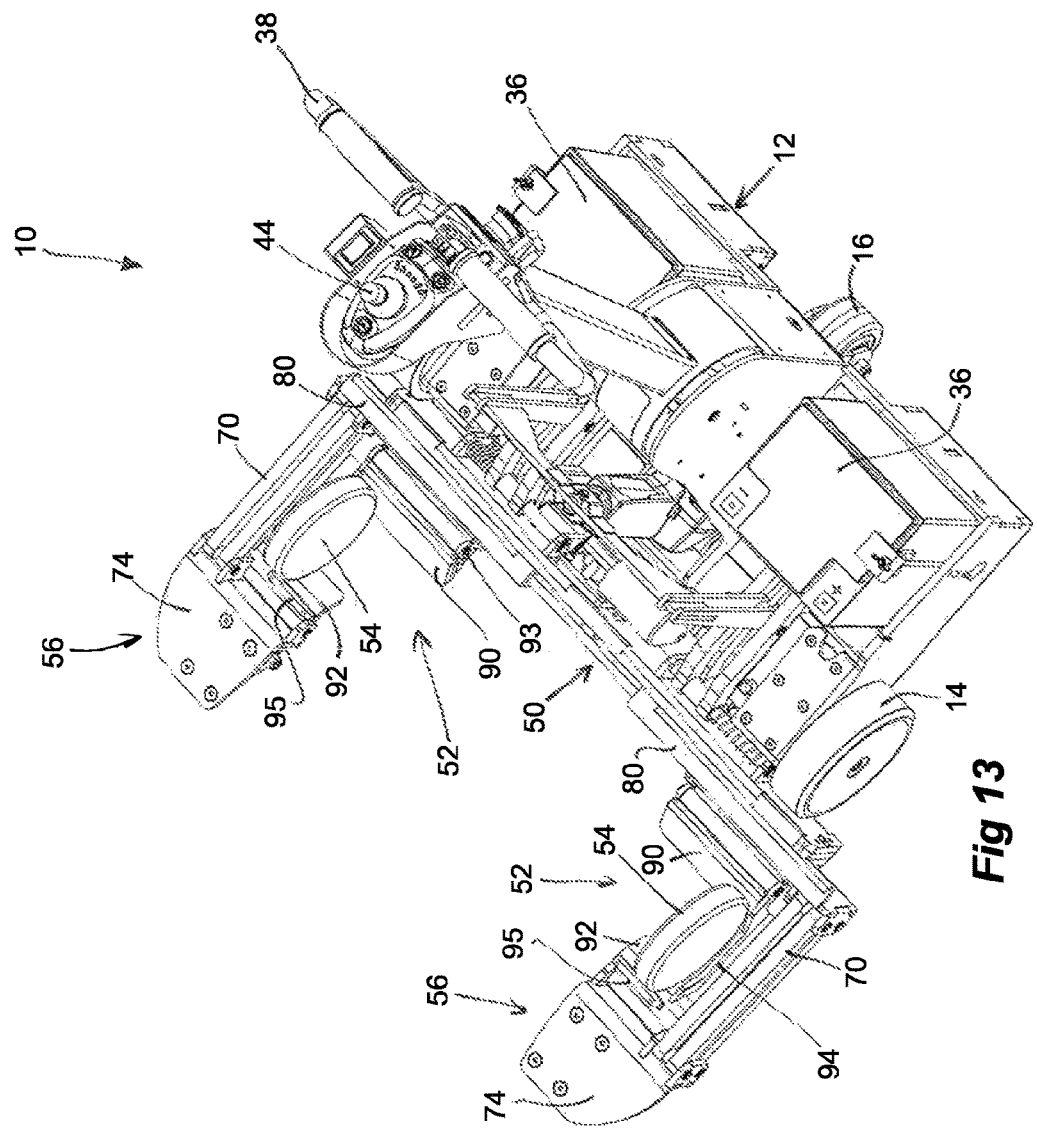
FIG. 13 illustrates a top, rear perspective view of the lifting and transporting device in the operational state shown in FIG. 12.

The top views of FIGS. 8, 10 and 12 show most clearly the components at the rear of the rack 50 which, according to an embodiment, allow its position to be moveable and therefore self-aligning as described above. In particular, the rack 50 is supported by two or more spring loaded pistons 96 disposed at front ends of the parallel linkage 60 and which extend parallel with the rack 50. The pistons are spring loaded such that the rack 50 is biased in a central position and movement to the left or right will be met with some resistance from the springs. The rack 50 can be shifted with respect to the frame in either transverse direction, for example, in the abovementioned circumstances. It can be clearly seen in FIGS. 12 and 13 that the spring on the right hand side has been compressed after the rack 50 has been forced to shift to the left.

Once the jaw assemblies have engaged the wheels, the actuator 30 can then be operated to drive the linkage system 58 and thereby lift the wheels. As described earlier, each castor wheel assembly 56 remains grounded during the lifting process, and hence so do the front ramps 92. Lifting of the wheels 54 is achieved by lifting of the rack 50 and hence the rear ramps 90 only, in this embodiment.

Once a bed or similar wheeled item has been transported, the wheels can be lowered by operating the actuator 30 again, and then operating the spur gear motor in the opposite direction until the jaw assemblies have moved outwardly a sufficient distance to allow the device to be reversed away from the bed. As the spur gear and hence rack 50 moves back towards the right hand side, the compressed spring extends and re-centres the rack 50. Actuation of the spur gear motor may also be controllable from the handle 38, for example, also using the control unit 42 and lever 44.

Therefore, according to an embodiment, the front wheels 14 and the front castor wheel assemblies 56 principally take the load of the bed. Thus, the rear castor wheel 16 is relatively free and can swivel allowing controlled movement of the bed even in confined spaces. The two powered driven wheels may be independently powered to effect steering of the machine and bed combination.

Figure 14:
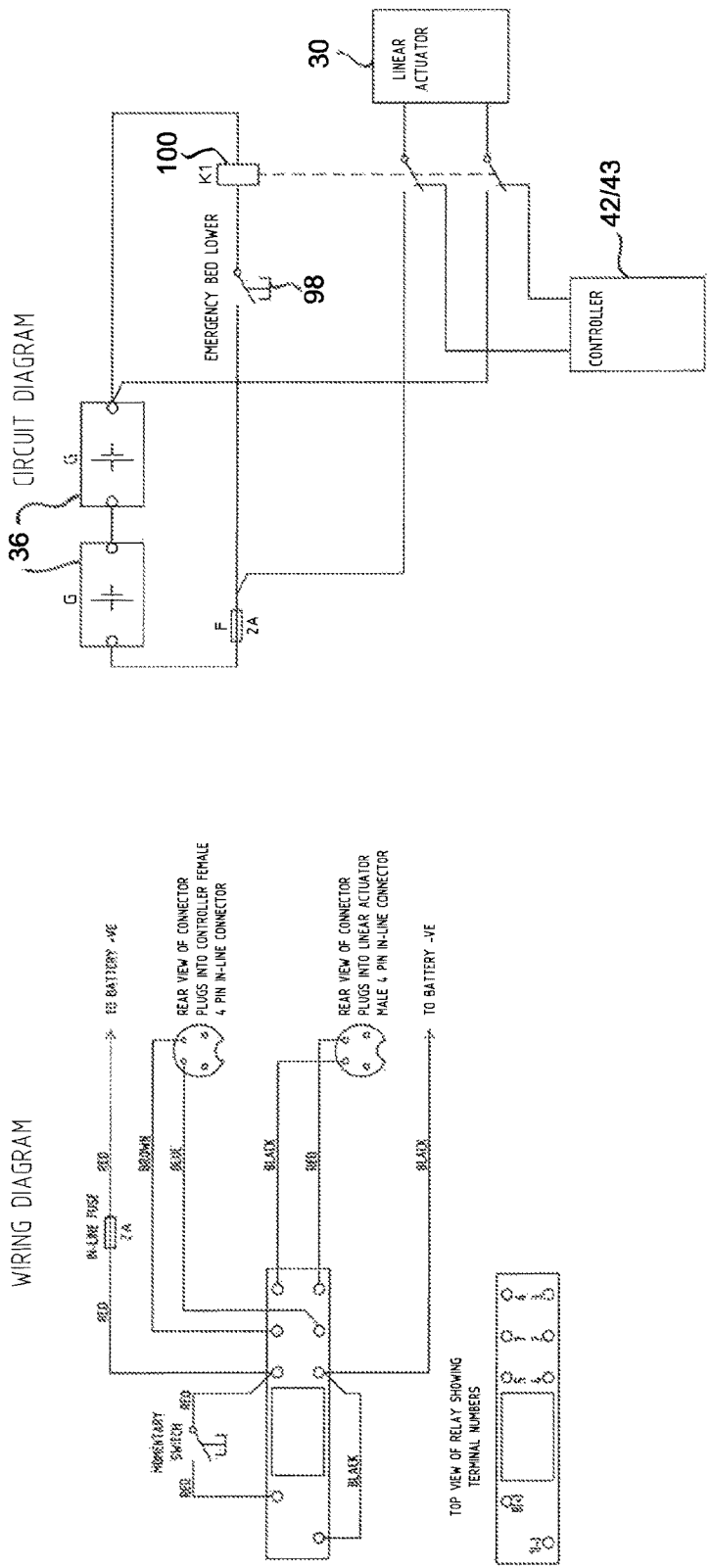
FIG. 14 illustrates an emergency bed release circuit and wiring diagram.

As mentioned earlier, the actuator 30 may be operated through use of a control unit 42 and associated lever 44, and may be powered by batteries 36. In the event of the control unit 42 or power module 43 malfunctioning, it may be necessary to have an alternate method of lowering the jaw assemblies 52, allowing the bed to be released. FIG. 14 shows a wiring and circuit diagram for bypassing the controller. By depressing a button 98, power is supplied directly to the actuator allowing it to be retracted and thereby lowering the jaw assemblies 52. A power relay 100 is incorporated into the circuit for switching the circuit and providing protection against current back flow into the module 43.

The lifting and transportation device 10 may be fitted with electric motors 28 for driving wheels 14, and associated reduction gearboxes. Each electric motor may incorporate an electromagnetic power off brake 101. When no current is provided the brake is applied and the bed mover cannot be moved. When current is supplied, the brake is released and the machine can be moved manually.

Figure 15:
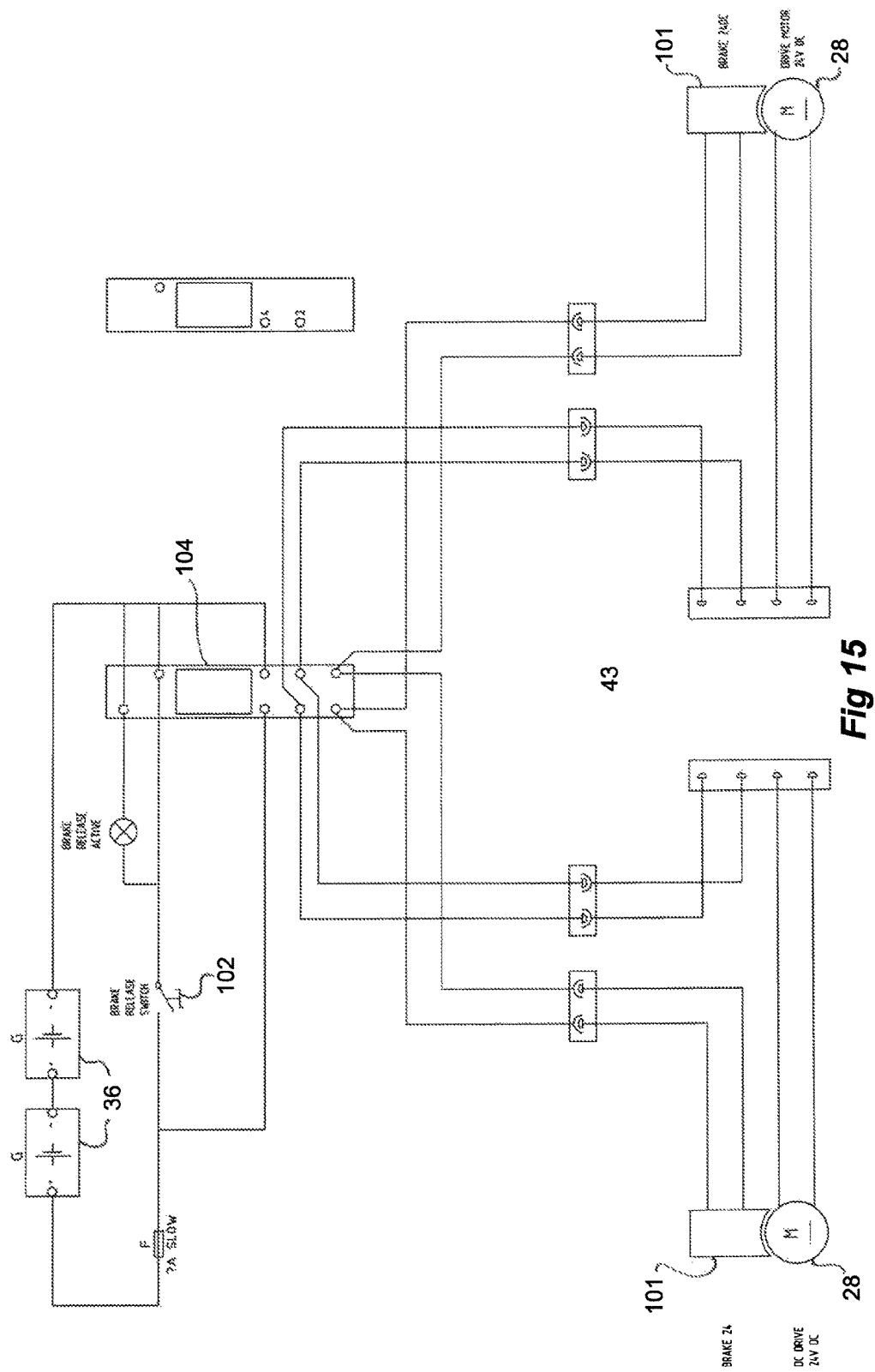
FIG. 15 illustrates a motor brake release circuit diagram.

The motors 28 may also be operated through use of the control unit 42, module 43 and batteries 36. The circuit proposed in FIG. 15, according to an embodiment, bypasses the controller and module 43 by depressing a button 102. The circuit is such that when the button is depressed, power is supplied directly to the brake mechanisms thereby releasing the brakes. A power relay 104 has again been incorporated into the circuit for switching the circuit and providing against current back flow into the module 43.

The invention has been described by way of example. The examples are not, however, to be taken as limiting the scope of the invention in any way. Modifications and variations of the invention such as would be apparent to a skilled addressee are deemed to be within the scope of the invention.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A lifting and transporting device for an item or part thereof having spaced apart wheels, said lifting device characterised by:
    a frame supported above wheels including at least one drive wheel for moving said frame, said wheels being load-supporting;
    at least one wheel engagement attachment supported by said frame, the attachment(s) configured to engage the spaced apart wheels of the item being lifted;
    a wheel assembly pivotally connected to the at least one wheel engagement attachment, each wheel assembly being forwardly disposed from the attachment such that one or more wheels of said wheel assembly are load-supporting for the item, the load of the item being distributed across the frame wheels and the wheel assemblies; and
    a means of lifting the at least one wheel engagement attachment to enable transportation of the item, wherein the means of lifting comprises a rack which through an actuator connected to the frame lifts the wheel engagement attachment, wherein the frame remains vertically stationary and wherein when the item is completely lifted, the wheels of the wheel assembly continue to be load-supporting;
    wherein said item includes two spaced apart wheels, and said frame includes a first axis extending along a centreline of the frame from a front to a rear of the device and wherein there are two wheel engagement attachments configured to support the two spaced apart wheels during lifting; and
    wherein each attachment is moveable with respect to the frame along a second axis which extends substantially perpendicularly to said first axis, wherein said engagement occurs when the attachments and wheels are first aligned along said second axis or an axis parallel thereto and the attachments then moved towards respective wheels until the attachments and wheels are substantially aligned along said first axis or an axis parallel thereto.

2. The lifting and transporting device as defined in claim 1 wherein each wheel engagement attachment extends between the rack disposed at the front of the frame, the rack adapted to support a rear of each wheel engagement attachment, and respective wheel assemblies disposed at the front of each attachment, the wheel assemblies adapted to support a front of each wheel engagement attachment.

3. The lifting and transporting device as defined in claim 2 wherein the rack and frame are associated via a rear linkage system including an actuator which allows for upward rotation of the rack relative to a rear pivot point.

4. The lifting and transporting device as defined in claim 3 wherein the rear linkage system includes an associated actuator for causing said upward rotation of the rack relative to the rear pivot point.

5. The lifting and transporting device as defined in claim 4 wherein said actuator includes a controller which allows an operator to control operation of the actuator and hence control lifting and lowering of the rack.

6. The lifting and transporting device as defined in claim 2 wherein lifting of the rack causes lifting of the rear portion of each wheel engagement attachment and hence lifting of the item wheels from a ground surface while the front wheel assemblies remain grounded.

7. The lifting and transporting device as defined in claim 6 wherein subsequent lowering of the rack causes lowering of the rear portion of each wheel engagement attachment and hence lowering of the item wheels to the ground surface while the front wheel assemblies remain grounded.

8. The lifting and transporting device as defined in claim 1 wherein each wheel engagement attachment is slidably moveable in equal and opposite directions along a rack disposed at the front of the frame and extending along a second axis or an axis parallel thereto.

9. The lifting and transporting device as defined in claim 8 wherein each wheel engagement attachment is adapted to be moved to a greater spaced apart distance than the wheels before being moved inwardly towards the respective wheels for engagement thereof.

10. The lifting and transporting device as defined in claim 9 wherein each wheel engagement attachment includes a jaw having at least a forward and rearward wheel abutment surface.

11. The lifting and transporting device as defined in claim 10 wherein said jaw is open on an inner side thereof for accepting said wheel when moving there towards.

12. The lifting and transporting device as defined in claim 9 wherein each wheel engagement attachment includes a means of adjusting the distance between said forward and rearward wheel abutment surface to accommodate wheels of different diameter.

13. The lifting and transporting device as defined in claim 8 wherein each wheel engagement attachment is adapted to be disposed between the wheels before being moved in an outwardly direction towards the respective wheels for engagement thereof.

14. The lifting and transporting device as defined in claim 13 wherein said jaw is open on an outer side thereof for accepting said wheel when moving there towards.

15. The lifting and transporting device as defined in claim 13 wherein each wheel engagement attachment includes a means of adjusting the distance between said forward and rearward wheel abutment surface to accommodate wheels of different diameter.

16. The lifting and transporting device as defined in claim 2 wherein each wheel engagement attachment is associated with a toothed rack respectively, each toothed rack being in meshed engagement with a driven spur gear associated with said rack, whereby rotation of said spur gear in one direction causes the attachments to move away from one another at a constant rate, and rotation in the opposite direction causes the attachments to move toward one another at a constant rate.

17. The lifting and transporting device as defined in claim 16 wherein when one attachment engages a first wheel before the other, one of said toothed racks stops and thereby causes the spur gear and hence second rack to continue moving towards the engaged jaw until the second wheel is engaged.

18. The lifting and transporting device as defined in claim 1 wherein the frame includes two drive wheels at a front thereof the frame and a rear steering wheel.

19. The lifting and transporting device as defined in claim 18 wherein the drive wheels are operated by two electric motors coupled to reduction gear boxes powered by one or more rechargeable batteries.

20. The lifting and transporting device as defined in claim 1 wherein the wheel assemblies are castor wheel assemblies.

21. The lifting and transporting device as defined in claim 2 wherein said rack includes a low profile so as not to interfere with low to mid obstructions associated with the item being transported.

22. The lifting and transporting device as defined in claim 1 wherein said item is a hospital bed having two front and two rear wheels, said two rear wheels adapted to be lifted by said device to facilitate transportation of the bed or bed/occupant.

* * * * *